(12) United States Patent
Smith

(10) Patent No.: US 6,629,178 B1
(45) Date of Patent: Sep. 30, 2003

(54) SYSTEM AND METHOD FOR CONTROLLING BUS ACCESS FOR BUS AGENTS HAVING VARYING PRIORITIES

(75) Inventor: David W. Smith, Cedar Park, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 559 days.

(21) Appl. No.: 09/595,598

(22) Filed: Jun. 15, 2000

(51) Int. Cl.[7] .................................................. G06F 13/36
(52) U.S. Cl. ........................................ 710/240; 710/107
(58) Field of Search ................................... 710/240, 241, 710/244, 113, 107, 36, 40, 48, 116; 370/444, 461; 340/825.51; 711/151, 158; 709/103

(56) References Cited

U.S. PATENT DOCUMENTS

| | | |
|---|---|---|
| 4,275,440 A | 6/1981 | Adams, Jr. et al. |
| 4,503,535 A | 3/1985 | Budde et al. |
| 4,729,093 A | 3/1988 | Mothersole et al. |
| 4,755,933 A | 7/1988 | Teshima et al. |
| 5,367,657 A | 11/1994 | Khare et al. |
| 5,438,666 A | 8/1995 | Craft et al. |
| 5,619,663 A | 4/1997 | Mizrahi-Shalom et al. |
| 5,673,415 A | 9/1997 | Nguyen et al. |
| 5,684,977 A | 11/1997 | Van Loo et al. |
| 5,721,865 A | 2/1998 | Shintani et al. |
| 5,802,292 A | 9/1998 | Mogul |
| 5,920,894 A | 7/1999 | Plog et al. |
| 6,058,461 A | 5/2000 | Lewchuk et al. |
| 6,065,099 A | 5/2000 | Clark et al. |
| 6,092,186 A | 7/2000 | Betker et al. |
| 6,438,635 B1 * | 8/2002 | Date et al. |

OTHER PUBLICATIONS

*PowerPC™ 601, RISC Microprocessor User's Manual*, ©Motorola Inc. 1993, Ch. 1, p. 10; Ch. 9, pp. 4–7, 22–27.
Tullsen et al., "Exploiting Choice: Instruction Fetch and Issue on an Implementable Simultaneous Multithreading Processor," May 1996, pp. 191–202.
*PCI Local Bus Specification*, Dec. 1998, pp. 11, 47–62, 68–74.
*Intel ® P6 Family of Processors, Hardware Developer's Manual*, Sep. 1998, Ch. 3, pp. 3–4.

* cited by examiner

*Primary Examiner*—Gopal C. Ray
(74) *Attorney, Agent, or Firm*—Lawrence J. Merkel; Meyertons, Hood, Kivlin, Kowert & Goetzel, P.C.; Erik A. Heter

(57) ABSTRACT

A system and method for bus arbitration. A computer system includes one or more buses for transferring data. Access to each bus is controlled by an arbitration unit. Various bus agents (i.e. peripherals) are coupled to the bus. Some bus agents are designated as normal-priority agents, while other bus agents are designated as high-priority bus agents. A high-priority bus agent may be a peripheral that is a latency-sensitive device. The arbitration unit may grant bus access to a normal-priority bus agent based on an arbitration scheme. When a high-priority bus agent requests access to the bus, the arbitration unit may cause the termination of access by the normal-priority bus agent. The high-priority bus agent is then granted access to the bus. When the high-priority bus agent has completed its use of the bus, the arbitration unit allows the normal-priority bus agent to regain access to the bus.

17 Claims, 4 Drawing Sheets

SYSTEM AND METHOD FOR CONTROLLING BUS ACCESS FOR BUS AGENTS HAVING VARYING PRIORITIES

BACKGROUND OF THE INVENTION

1. Field of the Invention

This invention relates to computer system, and more particularly, to bus arbitration on multi-master buses.

2. Description of the Relevant Art

Computer systems typically use buses as a primary means of communication between various peripheral devices and a central processing unit (CPU). A bus in which two peripheral devices may autonomously communicate with each other is referred to as a multi-master bus. Examples of such multi-master a bus includes the Peripheral Component Interconnect (PCI) bus and the Advanced Graphics Port (AGP) bus. In a multi-master bus, the peripheral given access to the bus is considered to be the master for the duration of the access. Multi-master buses typically utilize an arbitration unit, which may employ a scheme to decide which peripheral may have access to the bus. Such a scheme may be based on a number of factors, such as the order in which requests are received or time elapsed since initial request.

A given bus arbitration scheme may rely on the behavior of devices connected to the bus in order to function effectively. Typically, in order to ensure fair access to the bus by all devices (also known as "bus agents"), the bus may rely on each device to relinquish mastership of the bus once it completes its current data transfer, if so requested by a bus arbitration unit. In many such buses, a bus arbitration unit may have no mechanism, or limited mechanisms, to force a given bus agent to relinquish control of the bus. In such cases, some bus agents may continue data transfers indefinitely, to the detriment of other bus agents. This problem may particularly affect bus agents known as high-priority bus agents.

A high-priority bus agent is one in which access to the bus is critical with respect to time. High-priority bus agents may include devices that require data to be moved within a fixed time scale (latency-sensitive devices), and peripherals that require a quick response to or from an external device. Another category of high-priority bus agents are soft devices, in which a system processor accomplishes with software many functions that would be otherwise accomplished with hardware in the device. Soft devices may include soft modems and soft network interface cards, as well as an assortment of other devices. Soft devices may be used in many instances to replace "hard" devices, which may accomplish a majority of their functions in hardware with minimal use of the system processor.

In many instances, if a high-priority bus agent does not gain access within a certain time period, the data which it must transfer or receive may be lost. Such lost data may cause erroneous operation of a computer system, and in some situations, may lead to fatal errors. For example, a soft modem may include the normal modulation and demodulation circuitry of a normal modem, while replacing most of the remaining hardware functions with software. Such a soft modem may lack the buffering of a normal modem. Thus, when receiving a large amount of data, the soft modem may be required to perform its processing functions as soon as the data is received. If the soft modem cannot gain access to the bus, data sent by the source may be lost. In some cases, this data may be critical to the operation of other programs, and failure to properly receive and process the sent data may cause these programs to crash or malfunction. In general, such a scenario is possible for a wide variety of high-priority bus agents where data transfers must occur within a critical time period.

SUMMARY OF THE INVENTION

The problems outlined above may in large part be solved by a system and method for bus arbitration. In one embodiment, a computer system includes one or more buses for transferring data. Access to each bus may be controlled by an arbitration unit and a bus interface unit. In addition to a processor, various bus agents (i.e. peripherals) may also be coupled to the bus. Some bus agents may be designated as normal-priority agents, while other bus agents may be designated as high-priority bus agents. A high-priority bus agent may be a peripheral that is a latency-sensitive device. The arbitration unit may grant bus access to a normal-priority bus agent based on an arbitration scheme. When a high-priority bus agent requests access to the bus, the arbitration unit may cause the termination of access by the normal-priority bus agent. The high-priority bus agent may then be granted access to the bus. When the high-priority bus agent has completed its use of the bus, the arbitration unit may then allow the normal-priority bus agent (that had access just prior to the high-priority agent) to regain access to the bus.

In one embodiment, an arbitration unit may be configured to receive bus request signals from each of a plurality of bus agents coupled to the bus. The arbitration unit may be configured to distinguish between a bus request signal received from a normal-priority bus agent and one received from a high-priority bus agent. After receiving a bus request signal from a high-priority bus agent, the arbitration unit may assert a bus disconnect signal. The bus disconnect signal may be received by the bus interface unit. The bus interface unit may terminate access to the bus by the normal-priority bus agent, while the arbitration unit may assert a bus grant signal to be received by the high-priority bus agent. Responsive to receiving the bus grant signal, the high-priority bus agent may begin transmitting or receiving data across the bus.

In general, the system and method may apply to any type of bus. Common bus types include the PCI bus, the AGP bus, ISA (Industry Standard Architecture) and EISA (Extended Industry Standard Architecture) bus, the General Purpose Instrument Bus (GPIB), and so on.

Thus, in various embodiments, the system and method for bus arbitration may allow access to a bus by high-priority bus agents in a timely manner, thereby allowing such devices to complete operations with no loss of data. Allowing preferential bus access to high-priority bus agents may furthermore prevent erroneous operation of the computer system in which the agents are operating.

BRIEF DESCRIPTION OF THE DRAWINGS

Other objects and advantages of the invention will become apparent upon reading the following detailed description and upon reference to the accompanying drawings in which.

Figure 1:
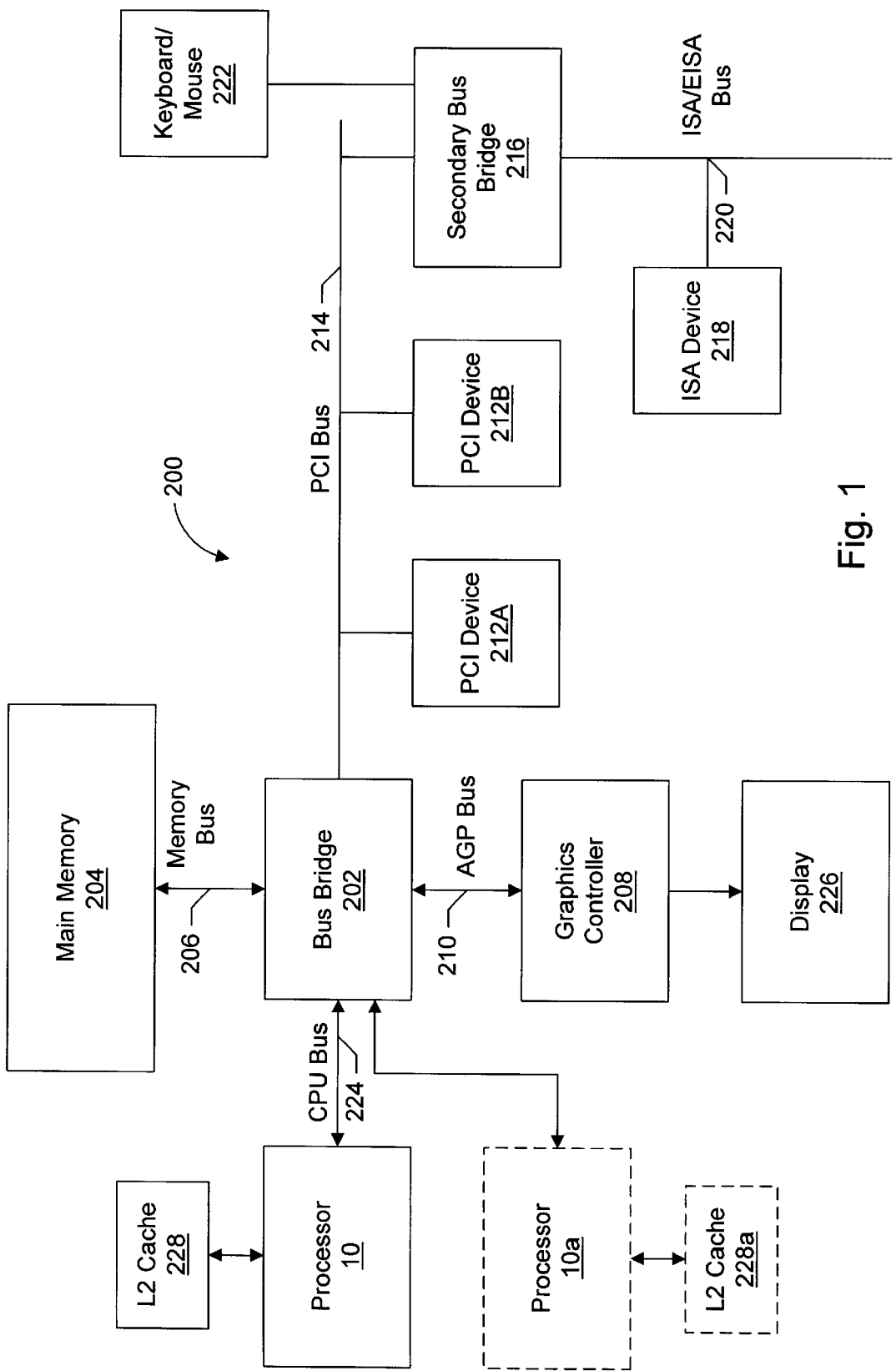
FIG. 1 is a block diagram of one embodiment of a computer system that may implement the system and method for bus arbitration.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined be the appended claims.

DETAILED DESCRIPTION OF THE INVENTION

Turning now to FIG. 1, a block diagram of one embodiment of a computer system 200 including processor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of Peripheral Component Interconnect (PCI) devices 212A–212B are coupled to bus bridge 202 through a PCI bus 214. A secondary bus bridge 216 may further be provided to accommodate an electrical interface to one or more Extended Industry Standard Architecture (EISA) or Industry Standard Architecture (ISA) devices 218 through an EISA/ISA bus 220. Processor 10 is coupled to bus bridge 202 through a CPU bus 224 and to an optional L2 cache 228.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between processor 10 and bus bridge 202 in other embodiments. Alternatively, the external cache may be coupled to bus bridge 202 and cache control logic for the external cache may be integrated into bus bridge 202. L2 cache 228 is further shown in a backside configuration to processor 10. It is noted that L2 cache 228 may be separate from processor 10, integrated into a cartridge (e.g. slot 1 or slot A) with processor 10, or even integrated onto a semiconductor substrate with processor 10.

Main memory 204 is a memory in which application programs are stored and from which processor 10 primarily executes. A suitable main memory 204 comprises DRAM (Dynamic Random Access Memory). For example, a plurality of banks of SDRAM (Synchronous DRAM) or Rambus DRAM (RDRAM) may be suitable.

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as General Purpose Instrument Bus (GPIB) or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of Advanced Graphics Port (AGP) bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10a shown as an optional component of computer system 200). Processor 10a may be similar to processor 10. More particularly, processor 10a may be an identical copy of processor 10. Processor 10a may be connected to bus bridge 202 via an independent bus (as shown in FIG. 5) or may share CPU bus 224 with processor 10. Furthermore, processor 10a may be coupled to an optional L2 cache 228a similar to L2 cache 228.

Figure 2:
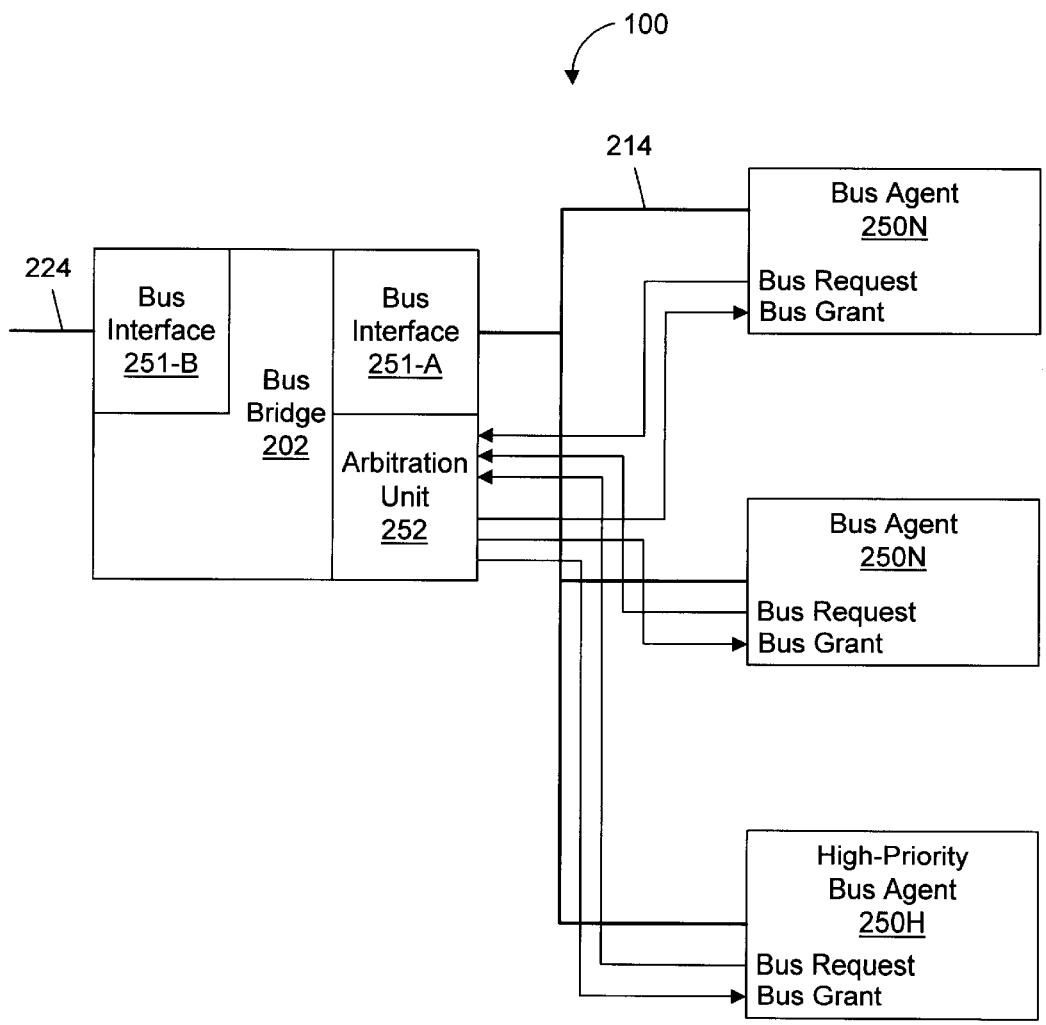
FIG. 2 is a block diagram of one embodiment of the system for bus arbitration.

Moving now to FIG. 2, a block diagram of one embodiment of the system for bus arbitration is shown. In this embodiment, bus arbitration system 100 includes bus bridge 202, which includes bus interface units 251 (251-A and 251-B) and arbitration unit 252. In various embodiments, bus bridge 202 may contain any number of bus interface units, each of which may be connected to a different bus. Additionally, each bus interface unit may have a bus arbitration unit associated with it. Bus interface unit 251-A is coupled to a plurality of bus agents 250 by bus 214. In this particular embodiment, bus 214 is equivalent to PCI bus 214 as shown in FIG. 1. However, it should be noted that bus arbitration system 100 is not limited to use with a PCI bus, but rather may be implemented with a variety of bus types. These bus types include, but are not limited to, an ISA/EISA bus, an AGP bus, a processor bus (such as a Pentium processor bus), or a General Purpose Instrument Bus (GPIB). Bus interface unit 251-B may be coupled to a processor bus 224, which may be equivalent to CPU bus 224 as shown in FIG. 1. In the embodiment shown, two normal priority bus agents 250N and one high-priority bus agent 250H are coupled to bus interface unit 251 via bus 214. The exact number of bus agents 250 is not specifically limited to a minimum or a maximum number, and may be any number in various embodiments. Multiple high-priority bus agents 250H may be coupled to a given bus, although preferably the number of high-priority bus agents is one per bus. Bus agents 250 may be various types of peripherals, and may be equivalent to PCI devices 212 (in the case of a PCI bus) or ISA device 218 (in the case of an ISA bus) shown in FIG. 1. A bus agent 250 may also be equivalent to graphics controller 208 of FIG. 1, which is coupled to an AGP bus. Furthermore, bus agents 250 may be devices connected to other types of buses not specifically cited here, and may be hard or soft devices, as explained above.

Bus interface unit 251-A may be configured to convert data to the correct protocol for transferring over the bus to one of bus agents 250. Bus interface unit 251-A may also receive data transferred from one of bus agents 250, and convert it to a protocol suitable for transferring to another bus interface unit, such as bus interface unit 251-B. For example, bus interface unit 251-A may receive data from a normal priority bus agent which is a PCI device and convert the data to a format suitable for bus interface unit 251-B, which may then convert and transfer the data across CPU bus 224 to processor 10 (of FIG. 1).

Arbitration unit 252 is configured to arbitrate access to bus 214 for bus agents 250. Arbitration unit 252 is coupled to receive bus request signals from each of bus agents 250, each indicating a request, or lack thereof, for bus access by its associated agent. Arbitration unit 252 may grant access to any one of bus agents 250 by asserting a bus grant signal to that particular bus agent. In one embodiment, the bus grant signal may stay asserted until the bus agent 250 has completed data transfers. In this embodiment, arbitration unit 252 may terminate bus access to a specific agent by de-asserting the bus grant signal. Alternate embodiments, wherein an arbitration unit may drive a "stop" signal to each bus agent coupled to the bus, are possible and contemplated.

For normal-priority bus agents 250N, arbitration unit 252 may decide which bus agent is granted the next access (i.e. which agent becomes the "bus master") based on an arbitration scheme. One possible arbitration scheme may grant access to the bus based on the order in which the requests were received, i.e. "first-come, first-served". Another possible arbitration scheme may be a "round-robin" scheme, wherein arbitration unit 252 may poll each of the normal-priority bus agents 250N, and granting access to a particular bus agent if it has a pending request. In general, a variety of possible arbitration schemes exist, any of which may be used by arbitration unit 252 to grant bus access to one of normal-priority bus agents 250N. If high-priority bus agent 250H requests bus access, arbitration unit 252 may cause bus unit 251-A to terminate bus mastership from any normal-priority bus agent 250N, and grant bus access to the requesting high-priority bus agent 250H.

A separate arbitration scheme may be employed by arbitration unit 252 in embodiments where multiple high-priority bus agents 250H are coupled to bus 214. The arbitration scheme used may be similar to that used for normal-priority bus agents 250N, with the exception that it applies only to high-priority bus agents 250H. Furthermore, the arbitration unit 252 employing the scheme may be configured satisfy all pending high-priority bus requests before satisfying any pending requests by normal-priority bus agents 250N.

Termination of bus mastership by a normal-priority bus agent may take one or more bus cycles to accomplish. In one embodiment, termination of bus mastership by a normal-priority bus agent 250N, and the beginning of data transfers by a high-priority bus agent 250H may take three bus cycles. The first clock cycle in the termination may include the last bus cycle of data transfers by the normal priority bus agent 250N that had the most recent mastership of the bus. A second bus cycle may be considered to be a "turnaround cycle", as the high-priority bus agent 250H prepares to begin transfers by assuming mastership of the bus. The high-priority bus agent 250H may begin data transfers on the third bus cycle.

Figure 3A:
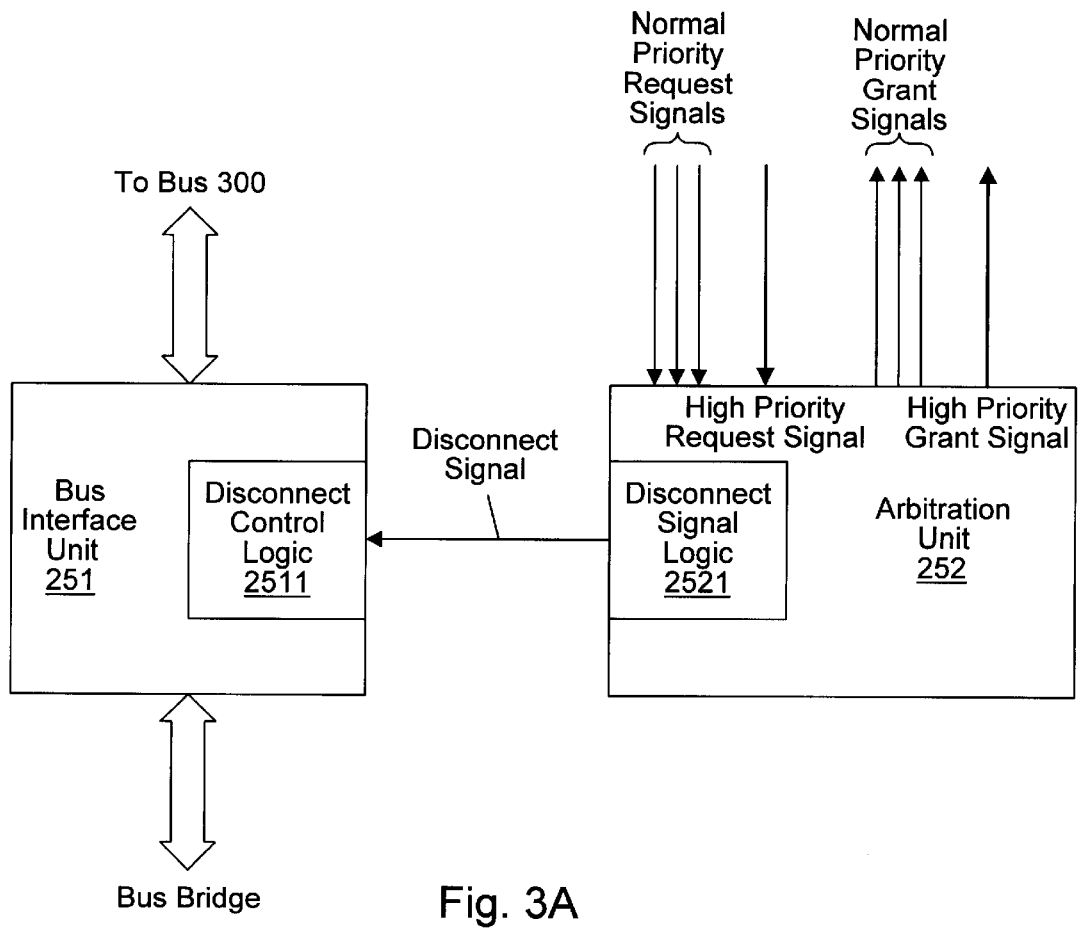
FIG. 3A is a block diagram illustrating one embodiment of the interface between the arbitration unit and the bus interface unit.
Figure 3B:
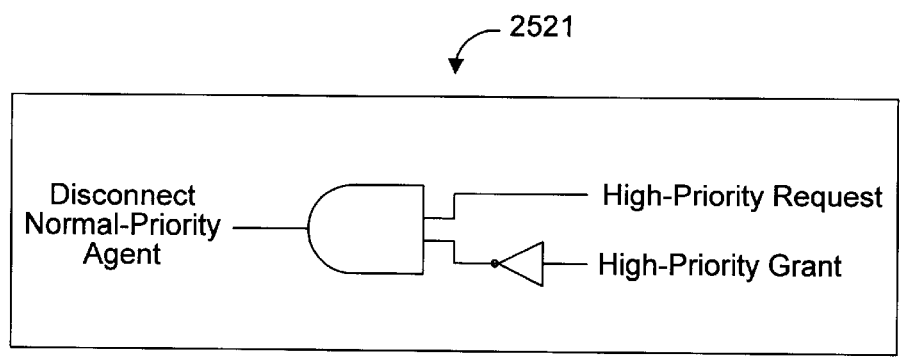
FIG. 3B is a logic diagram illustrating one embodiment of the disconnect logic for normal-priority bus agents.

FIGS. 3A and 3B illustrate one embodiment of bus interface unit 251 (such as bus interface unit 251-A of FIG. 2) and arbitration unit 252 in further detail. As shown in FIG. 3A, arbitration unit 252 is configured to receive bus access requests from normal-priority bus agents 250N and high-priority bus agents 250H. Bus arbitration unit 252 may also assert one of several bus grant signals for normal-priority bus agents 250N and high-priority bus agents 250H. If a high-priority bus agent 250H requests bus access, disconnect signal logic 2521 may assert a disconnect signal. This disconnect signal may be received by disconnect control logic 2511 of bus interface unit 251. Responsive to receiving the disconnect signal, disconnect control logic 2511 may cause bus interface unit 251-A to initiate the disconnection from the bus of a normal-priority bus agent 250N. In one embodiment, bus interface unit 251-A may simply refuse to receive more data from the normal-priority bus agent 250N which currently holds bus mastership. Bus interface unit 251-A may also assert a termination signal that may be driven to the current bus master, which may cause the device to stop sending data. The normal-priority bus agent may also stop sending data over the bus responsive to arbitration unit 252 de-asserting a bus grant signal driven to the device, which may occur responsive to arbitration unit 252 receiving a bus request from a high-priority bus agent. The de-assertion of the bus grant signal, in conjunction with bus interface unit 251-A asserting a termination signal may ensure that the current bus master relinquishes control of the bus.

The bus arbitration system 100 may be able to take advantage of some existing bus disconnect mechanisms. For example, a transaction on a PCI bus may be terminated by a current bus master, or by a target device which may be receiving data from the bus master (which may include a bus interface unit such as bus interface unit 251-A). A master may terminate a transaction due to completion (that is, all intended data has been transferred), or by a timeout. In the case of a timeout, a latency timer internal to the bus master may have expired and a grant signal driven to the master may be deasserted. A value programmed into a latency time may represent a minimum number of clock cycles allotted to its associated master, after which is must relinquish control to the bus following a de-assertion of the grant signal. In a target-initiated termination, a target device may assert a "stop" signal, driving this signal to the bus master, thereby indicating that it may not be able to receive data. The target-initiated termination may be initiated if the target is temporarily able to process a transaction, or if the target is unable to respond within a certain latency requirement.

In addition to the PCI bus disconnect mechanisms described above, embodiments utilizing bus arbitration system 100 with other types of buses, such as ISA, AGP, or GPIB bus, are possible and contemplated. Such embodiments may use the termination mechanisms defined for those buses.

As shown in FIG. 3B, disconnect signal logic 2521 may be configured to assert the disconnect signal upon receiving a bus access request from a high-priority bus agent. In the embodiment shown, the high-priority request signal may be asserted in a logic high state when a high-priority bus agent 250H requests access to the bus. The high-priority grant signal, normally asserted as a logic high, may initially be in a logic low state at the time the bus access request is made. The logic low state of the high-priority grant signal may then be inverted to a logic high state by the inverter at the AND gate input, resulting in two logic-high inputs to the gate. This may then result in the assertion of disconnect signal at the output of the AND gate. Once the arbitration unit grants bus access to the high-priority bus agent, the high-priority grant signal may then be driven high, which may result in the deassertion of the disconnect signal.

It is noted in the embodiments illustrated herein that various signals are active high. Other embodiments that may include some active low signals, or all active low signals, are possible and contemplated.

Figure 4:
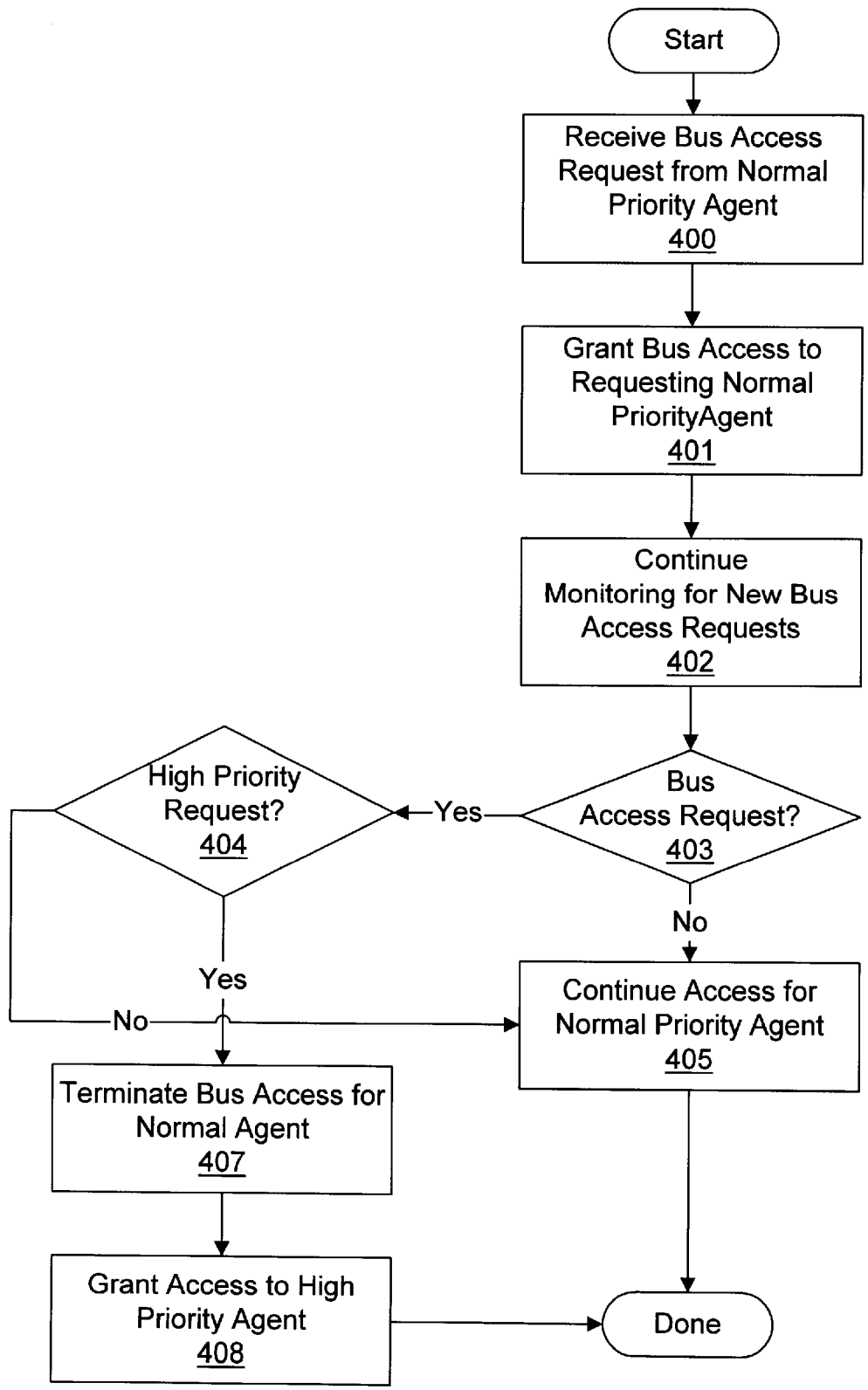
FIG. 4 is a flow diagram illustrating the operation of one embodiment of the system and method for bus arbitration.

Turning now to FIG. 4, a flow diagram illustrating the operation of one embodiment of the system and method for bus arbitration is shown. The method begins with Step 400, wherein an arbitration unit (such as arbitration unit 252 of FIGS. 2 and 3A) receives a bus access request from a normal-priority bus agent. The arbitration unit may then decide whether (and when) to grant access to the requesting bus agent based on the arbitration scheme currently in use, depending on whether any other bus agent currently has access to the bus. The arbitration unit may grant bus access to the requesting bus agent once it has determined it can do so (Step 401). The requesting bus agent may then assume mastership of the bus, and begin data transfers. Simultaneously, the arbitration unit may continue to monitor those agents coupled to the bus for further bus access requests (Step 402).

If the arbitration unit receives a bus access request (Step 403) while a normal-priority bus agent has mastership of the bus, it may then make a determination as the whether or not the request originated from a high-priority bus agent (Step 404). If the newly received request originated from another normal-priority bus agent, the agent that currently has mastership of the bus may be allowed to continue its use of the bus (Step 405).

If the newly received request is from a high-priority bus agent, the arbitration unit may begin the process of terminating bus access for the normal-priority bus agent (Step 407). Termination of bus access for the normal-priority bus agent may include the arbitration unit asserting a disconnect signal, as described in reference to FIGS. 3A and 3B. Once the normal-priority bus agent has been disconnected from the bus, access may be granted to the requesting high-priority bus agent (Step 408).

In the embodiment illustrated in this flowchart, it is assumed that only one high-priority bus agent is coupled to the bus. Other embodiments that may include multiple high-priority bus agents coupled to a given bus are possible and contemplated. In such embodiments, an arbitration unit may decide bus access among competing high-priority bus agents exclusive of any requests for access by normal priority bus agents.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A computer system comprising:

a bus;

an arbitration unit coupled to said bus;

a plurality of bus agents coupled to said bus, said plurality of bus agents including one or more high-priority bus agents and one or more normal-priority bus agents, and wherein said arbitration unit is configured to cause a termination of mastership of said bus by one of said normal-priority bus agents responsive to receiving a bus access request from one of said high-priority bus agents; and a first bus interface unit coupled to said arbitration unit, wherein said arbitration unit is configured to assert a bus disconnect signal responsive to a bus access request from a high-priority bus agent, wherein said bus disconnect signal is received by said bus interface unit.

2. The computer system as recited in claim 1, wherein said arbitration unit is further configured to grant bus access to said one of said high-priority bus agents responsive to receiving a bus access request from said one of said high-priority bus agents.

3. The computer system as recited in claim 2, wherein said one of said normal-priority bus agents is allowed to resume access to said bus following completion of bus access by said high-priority bus agent.

4. The computer system as recited in claim 1, wherein said arbitration unit is configured to receive a bus request signal from each of said plurality of bus agents.

5. The computer system as recited in claim 4, wherein said arbitration unit is configured to determine if a bus request signal originated from a normal-priority bus agent or a high-priority bus agent.

6. The computer system as recited in claim 1, wherein said arbitration unit is configured to assert a bus grant signal for each of said plurality of bus agents.

7. The computer system as recited in claim 1, wherein said arbitration unit is configured to grant access to said bus to one of said normal-priority bus agents based on an arbitration scheme.

8. The computer system as recited in claim 1, wherein said first bus interface unit is configured to terminate a bus access by one of said normal-priority bus agents responsive to receiving said bus disconnect signal.

9. The computer system as recited in claim 1, wherein said arbitration unit is configured to de-assert said bus disconnect signal responsive to granting bus access to said high-priority bus agent.

10. The computer system as recited in claim 1 further comprising a processor and a processor bus coupled to said processor.

11. The computer system as recited in claim 10 further comprising a second bus interface unit, wherein said first bus interface unit is coupled to said second bus interface unit, and wherein said second bus interface unit is coupled to said processor bus.

12. A method of operating a computer system, the method comprising:

granting access to a bus for a normal-priority bus agent;

granting access to said bus for a high-priority bus agent responsive to a request for access by said high-priority bus agent, wherein access to said bus by said normal-priority bus agent is terminated responsive to said request for access by said high-priority bus agent;

controlling access to said bus by an arbitration unit; and asserting a disconnect signal responsive to a request for bus access by said high-priority bus agent, said asserting performed by said arbitration unit.

13. The method as recited in claim 12 further comprising resuming said access to said bus by said normal-priority bus agent following completion of access to said bus by said high-priority bus agent.

14. The method as recited in claim 12 further comprising said arbitration unit de-asserting said disconnect signal responsive to granting bus access to said high-priority bus agent.

15. The method as recited in claim 14, further comprising receiving bus request signals in said arbitration unit from one or more normal-priority bus agents and one or more high-priority bus agents.

16. The method as recited in claim 15, wherein said granting access to said one or more normal-priority bus agents based on an arbitration scheme.

17. The method as recited in claim 15, determining in said bus arbitration unit whether a bus access request originated from a normal-priority bus agent or a high-priority bus agent.

* * * * *